(12) United States Patent
Shiomi

(10) Patent No.: US 11,349,403 B2
(45) Date of Patent: May 31, 2022

(54) HALF-BRIDGE CIRCUIT, POWER SUPPLY DEVICE, AND METHOD FOR DRIVING HALF-BRIDGE CIRCUIT

(71) Applicant: Sharp Kabushiki Kaisha, Sakai (JP)

(72) Inventor: Takeshi Shiomi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 151 days.

(21) Appl. No.: 16/705,787

(22) Filed: Dec. 6, 2019

(65) Prior Publication Data

US 2020/0195158 A1 Jun. 18, 2020

(30) Foreign Application Priority Data

Dec. 14, 2018 (JP) .............................. JP2018-234917

(51) Int. Cl.
*H02M 3/335* (2006.01)
*H02M 1/088* (2006.01)

(52) U.S. Cl.
CPC ....... *H02M 3/33584* (2013.01); *H02M 1/088* (2013.01)

(58) Field of Classification Search
CPC .... H02M 3/335; H02M 1/088; H02M 3/1582; H02M 3/1584; H02M 3/285; H02M 3/33561; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 7/49; H02J 3/38; H02J 3/46
See application file for complete search history.

(56) References Cited

U.S. PATENT DOCUMENTS

2020/0036282 A1* 1/2020 Escudero Rodriguez ................... H02M 3/33592

FOREIGN PATENT DOCUMENTS

| JP | 2011-036075 A | 2/2011 |
| JP | 2013-198298 A | 9/2013 |

* cited by examiner

*Primary Examiner* — Bryan R Perez
(74) *Attorney, Agent, or Firm* — Keating & Bennett, LLP

(57) ABSTRACT

In a half-bridge circuit, in a case that a first transistor element is turned ON, a primary winding current flows from a power supply to a primary winding. Then, in a case that the first transistor element is turned OFF, (i) a first rectifying element current flows from a secondary winding to a first rectifying element, or (ii) a second rectifying element current flows from a tertiary winding to a second rectifying element.

16 Claims, 9 Drawing Sheets

HALF-BRIDGE CIRCUIT, POWER SUPPLY DEVICE, AND METHOD FOR DRIVING HALF-BRIDGE CIRCUIT

CROSS-REFERENCE TO RELATED APPLICATIONS

This application claims the benefit of priority to Japanese Patent Application Number 2018-234917 filed on Dec. 14, 2018. The entire contents of the above-identified application are hereby incorporated by reference.

BACKGROUND

Technical Field

The following disclosure relates to a half-bridge circuit.

In a half-bridge circuit used in a power supply circuit, it is known that a reverse recovery current (also referred to herein as a transient current) is generated. This transient current is generated by applying a voltage that inhibits a rectified current when a rectified current is flowing to a switching element such as a Metal Oxide Semiconductor Field Effect Transistor (MOSFET). This transient current produces a loss in the circuit, and thus various countermeasure methods have been studied.

JP 2011-36075 A and JP 2013-198298 A disclose circuits that are intended to reduce transient current. For example, in the circuit disclosed in JP 2011-36075 A, a diode and a transformer connected in parallel to a switching element are provided to reduce transient current. In JP 2013-198298 A as well, a circuit similar to that in JP 2011-36075 A is disclosed.

However, as described later, there is still room for improvement in reducing the transient current in a half-bridge circuit. An object of an aspect of the present disclosure is to effectively reduce transient current in a half-bridge circuit.

SUMMARY

To solve the above-described problem, a half-bridge circuit according to an aspect of the present disclosure includes a first switching element connected to a first terminal serving as a high-voltage node and a second terminal serving as a switch node and a second switching element connected to a third terminal serving as a switch node and a fourth terminal serving as a low-voltage node. The half-bridge circuit further includes a transformer including a primary winding, a secondary winding, and a tertiary winding, a first rectifying element connected in parallel with the first switching element with the secondary winding interposed between the first rectifying element and the first switch element, a second rectifying element connected in parallel with the second switching element with the tertiary winding interposed between the second rectifying element and the second switch element, a first transistor element connected to the primary winding, and a power supply connected to the primary winding. In a case that the first transistor element is turned ON, a primary winding current, serving as a current flowing from the power supply to the primary winding, flows, and in a case that the first transistor element is turned OFF, (i) a first rectifying element current, serving as a current flowing from the secondary winding to the first rectifying element, flows, or (ii) a second rectifying element current, serving as a current flowing from the tertiary winding to the second rectifying element, flows.

Further, to solve the above-described problem, a method for driving a half-bridge circuit according to an aspect of the present disclosure is a method for driving a half-bridge circuit including a first switching element connected to a first terminal serving as a high-voltage node and a second terminal serving as a switch node and a second switching element connected to a third terminal serving as a switch node and a fourth terminal serving as a low-voltage node. The half-bridge circuit further includes a transformer including a primary winding, a secondary winding, and a tertiary winding, a first rectifying element connected in parallel with the first switching element with the secondary winding interposed between the first rectifying element and the first switching element, a second rectifying element connected in parallel with the second switching element with the tertiary winding interposed between the second rectifying element and the second switching element, a first transistor element connected to the primary winding, and a power supply connected to the primary winding. The method includes a first step for applying a forward voltage to the first switching element and causing a rectified current to flow to the first switching element, a second step for turning the first transistor element ON after the first step and causing a primary winding current, serving as a current flowing from the power supply to the primary winding, to flow, a third step for turning the first transistor element OFF after the second step and causing a first rectifying element current, serving as a current flowing from the secondary winding to the first rectifying element, to flow, and a fourth step for applying a reverse voltage to the first switching element after the third step within a time period when the first rectifying element current is flowing.

According to the half-bridge circuit according to an aspect of the present disclosure, it is possible to effectively reduce transient current. Further, according to the method for driving the half-bridge circuit according to an aspect of the present disclosure, the same effects can be achieved.

BRIEF DESCRIPTION OF THE DRAWINGS

The disclosure will be described with reference to the accompanying drawings, wherein like numbers reference like elements.

DESCRIPTION OF EMBODIMENTS

First Embodiment

Figure 1:
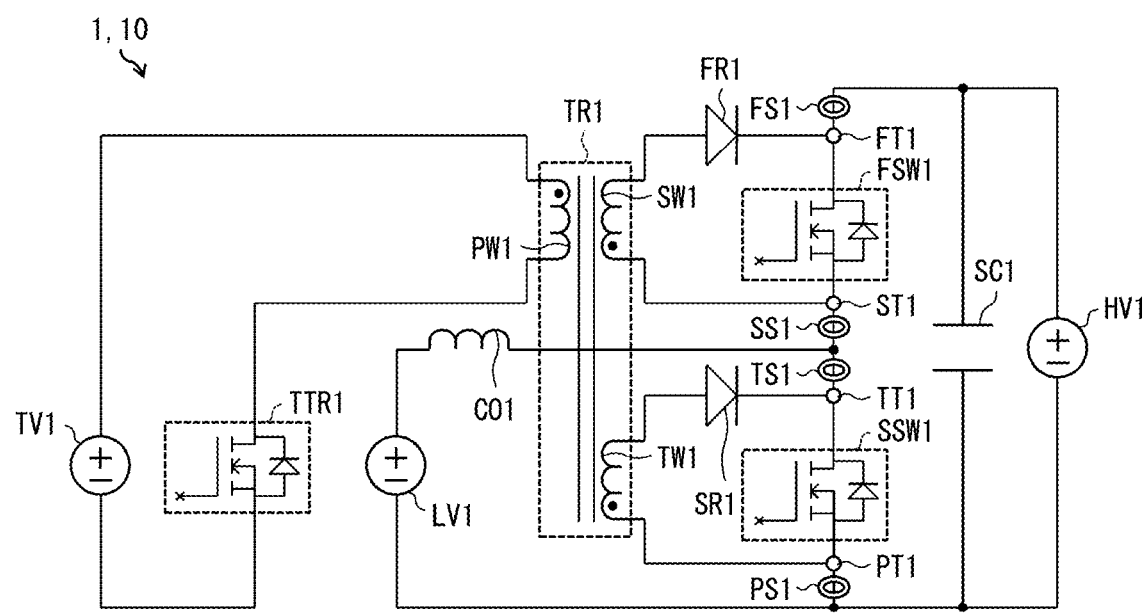
FIG. 1 is a diagram illustrating a circuit configuration of a power supply circuit according to a first embodiment.

A half-bridge circuit 1 of the first embodiment will be described below. Note that, for convenience of description, in each embodiment hereinafter, components having the same functions as those of components described in the first embodiment are denoted using the same reference numerals, and descriptions thereof will not be repeated.

Purpose of Half-Bridge Circuit 1

As described above, a transient current flows in a half-bridge circuit. Transient current is known to be mainly generated in a switching element with a PN junction.

Meanwhile, examples of semiconductor elements without a PN junction include a SiC Schottky Barrier Diode (SBD), a GaN High Electron Mobility Transistor (HEMT), and the like. In these semiconductors, transient current originating from the PN junction does not occur. However, these switching elements are provided with parasitic capacitance. As a result, there is a problem in that, in association with the application of voltage for inhibiting the rectified current, a charging current (transient current) of the parasitic capacitance flows. The half-bridge circuit 1 is created for the purpose of reducing these transient currents.

Definitions of Terms

Prior to describing the half-bridge circuit 1, each term is defined herein as follows.

The term "forward voltage" refers to a voltage for causing a forward current to flow to a rectifying element. Consider, as a first example, a case in which the rectifying element is a diode. In this case, "forward voltage" refers to the voltage applied to cause a forward current to flow to the diode.

Consider, as a second example, a case in which the rectifying element is a MOSFET, a GaN-HEMT, or the like. That is, consider a case in which the rectifying element includes a gate, a source, and a drain. In this case, the forward voltage refers to the "voltage allowing current to flow in the rectifying element in a case in which a positive voltage is applied to the source based on the drain when the gate is OFF (the gate voltage is less than a threshold voltage)."

These two examples are the same as applying a positive voltage to ST1 based on FT1 of FIG. 1 described later. The size of the forward voltage depends on the type of element, but is, for example, from 0.1 V to 5 V. The size of the current that occurs in association with application of the forward voltage depends on the current of the inductive element, such as a coil, but is, for example, from 0.1 A to 100 A.

The term "rectified current" refers to a forward current flowing in a rectifying element. In the example of FIG. 1, the rectified current can be measured at FS1 and SS1 as well as TS1 and PS1 described later.

The term "reverse voltage" refers to a voltage applied to the rectifying element so that a forward current does not flow. Consider, as a first example, a case in which the rectifying element is a diode. In this case, the voltage applied so that a forward current does not flow to the diode is the reverse voltage.

Consider, as a second example, a case in which the rectifying element is a MOSFET, a GaN-HEMT, or the like. In this case, the reverse voltage refers to the "positive voltage applied to the drain based on the source when the gate is OFF (the gate voltage is less than a threshold voltage)." The two examples described above are the same as applying a positive voltage to FT1 based on ST1 of FIG. 1. Further, the two examples described above are the same as applying a positive voltage to TT1 based on PT1 of FIG. 1. The size of the reverse voltage depends on circuit specifications, but is, for example, from 1 V to 1200 V.

The term "transient current" generally refers to a reverse recovery current and a charging current of the parasitic capacitance of a rectifying element. That is, the transient current refers to a transient current that occurs in a case that a reverse voltage is applied to a rectifying element. In the example of FIG. 1, the transient current can be measured at FS1 and SS1 as well as TS1 and PS1.

The term "rectifier function" refers to a function that conducts only a current flowing in one direction and does not conduct a current in a direction opposite to that direction. Consider, as a first example, a case in which the rectifying element is a diode. In this case, the rectifier function refers to the function of the diode conducting the forward current and blocking the reverse current.

Consider, as a second example, a case in which the rectifying element is a MOSFET, a GaN-HEMT, or the like. In this case, the rectifier function refers to the function of the rectifying element that conducts current from the source to the drain and blocks current from the drain to the source at gate OFF. In a case that the rectifying element is a MOSFET or a GaN-HEMT, (i) the source can be considered the anode of the diode, and (ii) the drain can be considered the cathode of the diode for the rectifier function.

The term "rectifying element" generally refers to an element having a rectifier function. Each of the diodes, MOSFETs, and GaN-HEMTs described above is an example of a rectifying element. In a case that the rectifying element is a diode, the (i) cathode is connected to FT1 of the rectifier circuit, and (ii) the anode is connected to ST1 of the rectifier circuit. Note that the term "connection" herein refers to an "electrical connection" unless expressly stated otherwise.

Note that an element (including a winding of a transformer as well) may be interposed as necessary in (i) the connection between the cathode and FT1 and (ii) the connection between the anode and ST1.

The term "transistor function" refers to a function capable of determining whether a current flows by ON/OFF of the gate only. In a case that the element is a MOSFET, a GaN-HEMT, or the like, the transistor function refers to the function of switching the current flowing from the drain toward the source by ON/OFF of the gate. Of course, to cause current to flow, it is also necessary to apply a positive voltage to the drain based on the source.

Note that in a case that the element is a bipolar transistor, an Insulated Gate Bipolar Transistor (IGBT), or the like, (i) the drain can be considered a collector, and (ii) the source can be considered an emitter.

The term "transistor element" generally refers to an element having a transistor function. As described above, a MOSFET, a GaN-HEMT, a bipolar transistor, an IGBT, and the like are transistor elements because they have a transistor function.

The term "switching element" generally refers to an element having a rectifier function and a transistor function. As described above, a MOSFET, a GaN-HEMT, and the like are switching elements because they have both the rectifier function and the transistor function. With regard to GaN-HEMTs, both enhancement mode and cascode type are switching elements.

On the other hand, a typical IGBT has a transistor function but does not have a rectifier function. Thus, to use an IGBT as a switching element, generally an IGBT provided with a reverse parallel diode is used. The IGBT applied to the switching elements described herein is defined as an IGBT of this type.

The term "rectifier function unit," in a case that one side arm (an upper arm side or a lower arm side) illustrated in FIG. 1 serves as a rectifier function, refers to a section in which a switching element, a rectifying element, and a transformer winding of the arm are formed as a set.

The term "transistor function unit" refers to a section that functions as a transistor. The term has the same meaning as transistor element. A rectifying element and a transformer winding are not included.

The term "first time period" refers to a time period in which the upper arm side is used as the rectifier function unit and the lower arm side is used as the transistor function unit. The length of the first time period is defined as the time period in which at least one cycle of a switching operation is repeated. As an example, the first time period is a time period during which a step-up operation of a bidirectional DC/DC converter is performed (step-up operation time period).

The term "second time period" refers to a time period in which the lower arm side is used as the rectifier function unit and the upper arm side is used as the transistor function unit. The length of the second time period is defined as the time period in which at least one cycle of a switching operation is repeated. As an example, the second time period is a time period during which a step-down operation of a bidirectional DC/DC converter is performed (step-down operation time period).

Overview of Configuration of Power Supply Circuit 10

FIG. 1 is a diagram illustrating a circuit configuration of a power supply circuit 10 according to the first embodiment. The power supply circuit 10 is a bidirectional DC/DC converter. That is, the power supply circuit 10 can transmit power bi-directionally (i) from a low-voltage power supply to a high-voltage power supply, or (ii) from a high-voltage power supply to a low-voltage power supply. In the power supply circuit 10, a known half-bridge circuit of the bidirectional DC/DC converter is replaced with the half-bridge circuit 1 of the first embodiment.

Note that each of the numerical values described below is merely an example.

Configuration of Low-Voltage Portion of Power Supply Circuit 10

A low-voltage portion is provided with a power supply LV1 (low-voltage power supply) and a coil CO1. The voltage of the power supply LV1 is 200 V. The (+) side of the DC power supply symbols in FIG. 1 indicates a positive pole side. The voltage of the (−) side is 0 V. An inductance of the coil CO1 is 500 µH. An average current of the coil CO1 in a steady state is 14 A.

Configuration of High-Voltage Portion of Power Supply Circuit 10

A high-voltage portion is provided with a power supply HV1 (high-voltage power supply) and a capacitor SC1. The voltage of the power supply HV1 is 400 V. The capacitor SC1 has a capacitance of 3.3 mF and a voltage of 400 V. In the power supply circuit 10, the voltage of the high-voltage portion is designed to be twice the voltage of the low-voltage portion.

Configuration of Half-Bridge Circuit 1 of Power Supply Circuit 10

A typical half-bridge circuit includes a first switching element FSW1 and a second switching element SSW1. In the half-bridge circuit 1, a transformer TR1, a first rectifying element FR1, a second rectifying element SR1, a transistor element TTR1, and a power supply TV1 are further provided to the typical half-bridge circuit. As described later, the transformer TR1 includes three types of windings (primary to tertiary windings).

Note that, in the following description, for purposes of simplicity of description, "the first switching element FSW1" is simply referred to as "FSW1," for example. The same applies to other such members as well.

The "first switching element FSW1" is a cascode GaN-HEMT connected to the upper arm side. In particular, FSW1 is a switching element in which a normally-ON GaN-HEMT is cascode-connected to a low-voltage Si-MOSFET. FSW1 has a drain withstand voltage of 650 V and an ON resistance of 50 mΩ. In the example of FIG. 1, the same circuit symbol as that for the MOSFET is used to represent the cascode GaN-HEMT.

The "second switching element SSW1" is a GaN-HEMT connected to the lower arm side. The type of GaN-HEMT used is the same as that of the GaN-HEMT connected to the upper arm side. SSW1 is the same as FSW1 except for the connection location.

The "first rectifying element FR1" is a SiC-SBD connected to the upper arm side. The reverse breakdown voltage of FR1 is 650 V. Further, the forward voltage of FR1 at a point in time when conduction starts is 0.9 V. The resistance of FR1 when the forward current is flowing is 50 mΩ. FR1 is connected in parallel with FSW1 with a secondary winding SW1 therebetween as described below. Herein, the connection relationship between FSW1 and FR1, denoted by the symbol in FIG. 1, is defined as a parallel connection. Further, FR1 may also be connected to the source side of FSW1 by switching the order of FR1 with SW1.

The "second rectifying element SR1" is a SiC-SBD connected to the lower arm side. SR1 is connected in parallel with SSW1 with a tertiary winding TW1 therebetween as described below. The element of SR1 used is the same type as that of FR1. Further, SR1 may also be connected to the source side of SSW1 by switching the order of SR1 with TW1.

The "transformer TR1" includes the primary winding PW1, the secondary winding SW1, and the tertiary winding TW1. The number of turns of PW1 is nine. The inductance of PW1 is 1.6 pH.

The resistance of PW1 is 10 mΩ. The inductance of PW1 is also referred to as excitation inductance. The number of turns of SW1 and TW1 is six each. The resistance of SW1 and TW1 is 7 mΩ each.

Further, in the half-bridge circuit 1, each component is connected so that the polarity of SW1 from the second terminal toward the first terminal and the polarity of TW1 from the fourth terminal toward the third terminal are the same.

The "transistor element TTR1" is connected to PW1. The element of TTR1 is the same as that of FSW1. However, TTR1 is used not as a switching element, but as a transistor element. The transistor element connected to PW1 is also referred to herein as a "first transistor element." TTR1 is an example of a first transistor element.

The "gate terminal of each element" is connected to a control circuit 9 described later (not illustrated in FIG. 1 or the like; refer to FIG. 9). That is, the ON/OFF switching of the gate of each element is performed by the control circuit 9. In this regard, the same applies to the second and subsequent embodiments.

The "power supply TV1" is connected to PW1. The voltage of TV1 is 15 V.

The "first terminal FT1" refers to an electrical connection point between a current path (hereinafter simply "path") of FSW1 and the path of FR1. Further, FT1 is set to a high-voltage node by the positive electrode of HV1. A high-voltage node is, for example, a node with a voltage from 100 V to 1000 V.

The "second terminal ST1" refers to an electrical connection point between the path of FSW1 and the path of FR1. The ST1 is a switch node in which the voltage is switched. A switch node is a node in which the voltage varies due to circuit operation.

The "third terminal TT1" refers to an electrical connection point between the path of SSW1 and the path of SR1. Note that TT1 is a switch node similar to ST1. Accordingly, TT1 and ST1 may be connected together at the same connection point.

The "fourth terminal PT1" refers to an electrical connection point between the path of SSW1 and the path of SR1. Further, PT1 is set to a low-voltage node by the negative electrode of HV1. The low-voltage node is a node having a lower voltage than the high-voltage node. In the first embodiment, the voltage of the low-voltage node is 0 V.

"FS1 and SS1" indicate a section where the rectified current and the transient current on the upper arm side can be measured. That is, neither FS1 nor SS1 are current sensors. In both FS1 and SS1, the same current values can be observed. Further, any current sensor can be used as the current sensor. For example, a Hall element type current sensor, a Current Transformer (CT) sensor, a Rogowski coil and shunt resistance method, or the like can be used.

"TS1 and PS1" indicate a section where the rectified current and the transient current on the lower arm side can be measured. Other aspects are the same as those of FS1 and SS1. Configuration of Power Supply Circuit 10r of Comparative Example First, consider the operation of a bidirectional DC/DC converter (hereinafter, a power supply circuit 10r) of a comparative example. The power supply circuit 10r is constituted by the typical half-bridge circuit described above. In other words, in the power supply circuit 10r, TR1, FR1, SR1, TTR1, and TV1 have been removed from the power supply circuit 10 illustrated in FIG. 1. The relationship between the operation of the power supply circuit 10r and transient current will be described in detail below.

First, the step-up operation will be described. The step-up operation is an operation in which power is transmitted from a low-voltage power supply to a high-voltage power supply. In the step-up operation, FSW1 is used as a rectifying element and SSW1 is used as a transistor element.

Step-Up Operation 1 of Comparative Example

First, in the ON time period of SSW1, the voltage of the switch nodes (ST1, TT1) is approximately 0 V. Thus, a voltage of 200 V is applied to CO1, increasing the coil current. The coil current follows the path "LV1 positive electrode→CO1→SSW1→LV1 negative electrode."

Step-Up Operation 2 of Comparative Example

Then, SSW1 is switched from ON to OFF. As a result, due to the electromotive force of CO1, the voltage of the switch node is approximately 1 V greater than the voltage of FT1. This voltage of approximately 1 V is applied as a forward voltage to FSW1, and a rectified current flows from CO1 to FSW1. The current follows the path "LV1 positive electrode→CO1→FSW1→HV1→LV1 negative electrode." Power is transmitted to HV1 by this current.

Step-Up Operation 3 of Comparative Example

Then, SSW1 is switched from OFF to ON. As a result, the voltage of the switch node is approximately 0 V. Thus, a reverse voltage of approximately 400 V is applied to FSW1. This reverse voltage of 400 V causes the parasitic capacitance of FSW1 to be charged and a transient current to occur.

In the step-up operation time period, the step-up operations 1 to 3 described above are repeatedly performed. The drive frequency of SSW1 is 100 kHz, and SSW1 repeatedly turns ON and OFF with a duty ratio of 50%. Thus, every 5 μsec, the forward voltage and the reverse voltage are alternately applied to FSW1.

Step-Down Operation of Comparative Example

The step-down operation will now be described. The step-down operation is an operation in which power is transmitted from a high-voltage power supply to a low-voltage power supply. In the step-down operation, FSW1 is used as a transistor element and SSW1 is used as a rectifying element. First, FSW1 is turned ON, causing the current to flow along the path "LV1 negative electrode→HV1→FSW1→CO1→LV1 positive electrode." Then, FSW1 is turned OFF, causing the current to flow along the path "LV1 negative electrode→SSW1→CO1→LV1 positive electrode." Then, FSW1 is switched from OFF to ON. As a result, a reverse voltage of approximately 400 V is applied to SSW1, and a transient current occurs.

In this way, by switching the role (function) of the switching element between the upper and lower arms, it is possible to make the half-bridge circuit selectively execute a step-up operation or a step-down operation.

Description of Drawing Used in Operation Explanation of First Time Period of Half-Bridge Circuit 1

The step-up operation of the half-bridge circuit 1 included in the power supply circuit 10 will now be described. In the step-up operation, FSW1 is used as a rectifying element (rectifier function unit) and SSW1 is used as a transistor element (transistor function unit). As such, the step-up operation time period is an example of the first time period.

Figure 2:
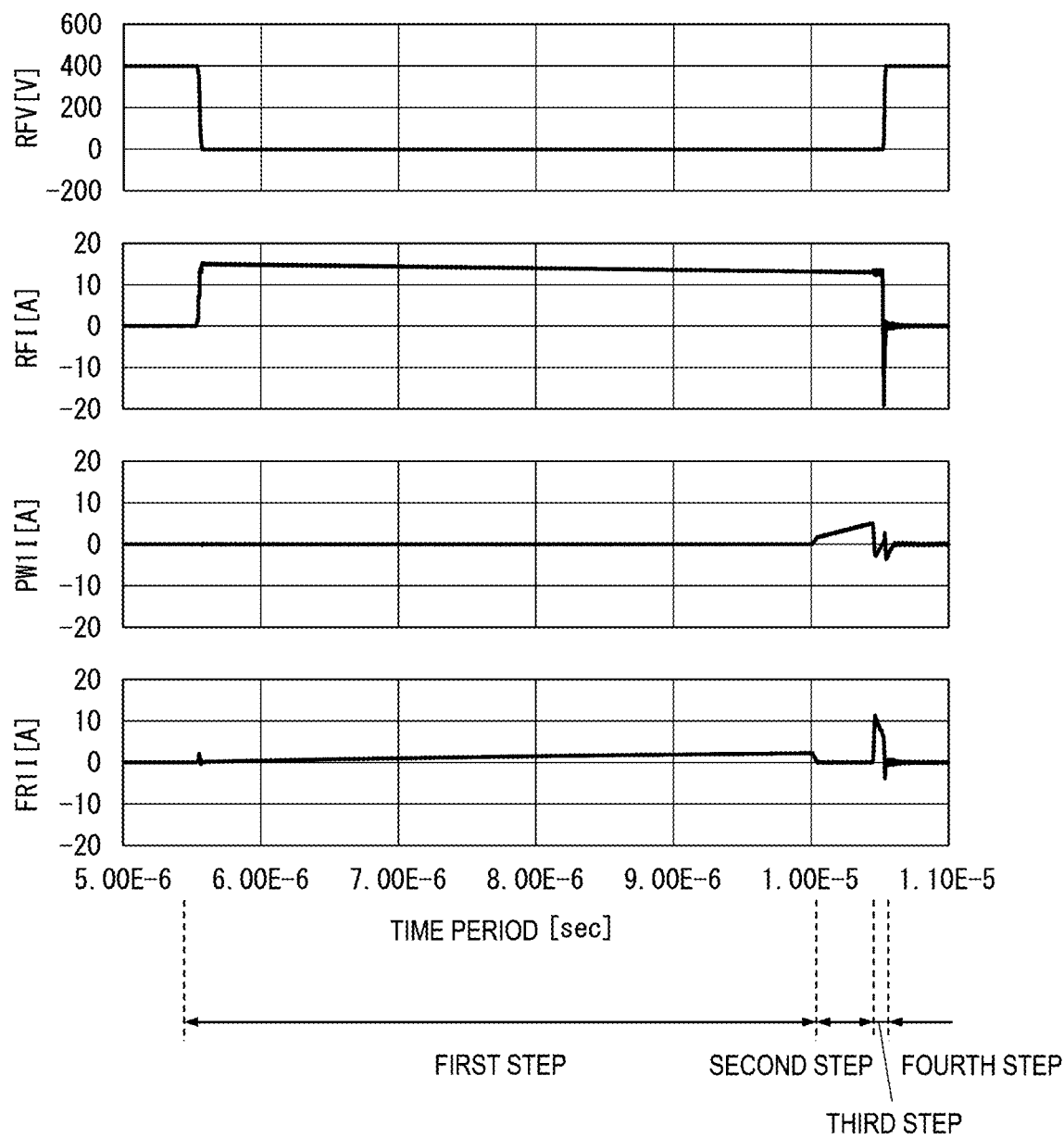
FIG. 2 is a diagram showing waveforms of each voltage and current.

FIG. 2 is a graph showing waveforms of each voltage and current of the half-bridge circuit 1. FIG. 2 shows four waveforms on a common time axis (horizontal axis). Further, the timing of first to fourth steps described below is indicated on the horizontal axis in FIG. 2.

The voltages and currents shown in FIG. 2 are:
RFV (rectifier function unit voltage): Voltage applied to FT1 based on ST1,
RFI (rectifier function unit current): Current flowing from ST1 to FT1,
PW1I (primary winding current): Current flowing from TV1 to PW1, and
FR1I (first rectifying element current): Forward current of FR1.

Figure 3:
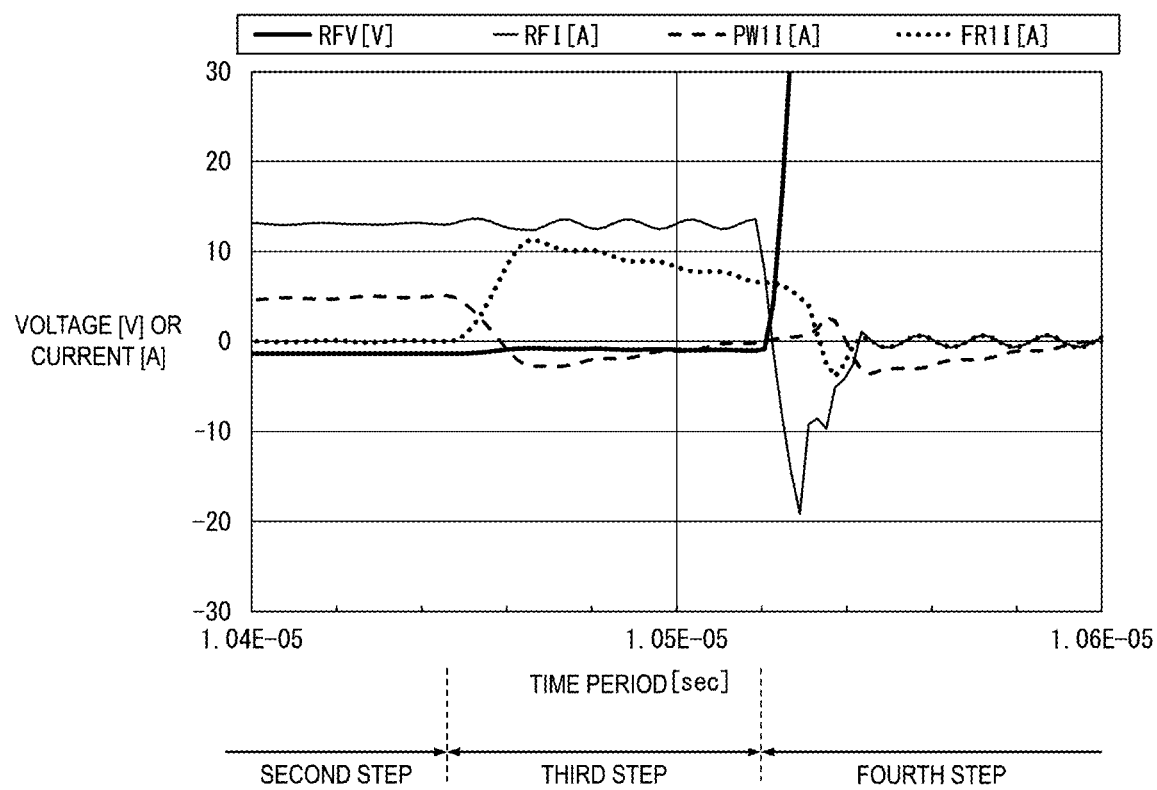
FIG. 3 is a diagram showing each graph of FIG. 2 enlarged.

FIG. 3 is a graph showing each graph of FIG. 2 enlarged. In FIG. 3, unlike FIG. 2, the four waveforms are shown in one graph. Note that, in FIG. 3, for convenience of the enlarged view, RFV extends beyond the upper end of the graph.

Figure 4:
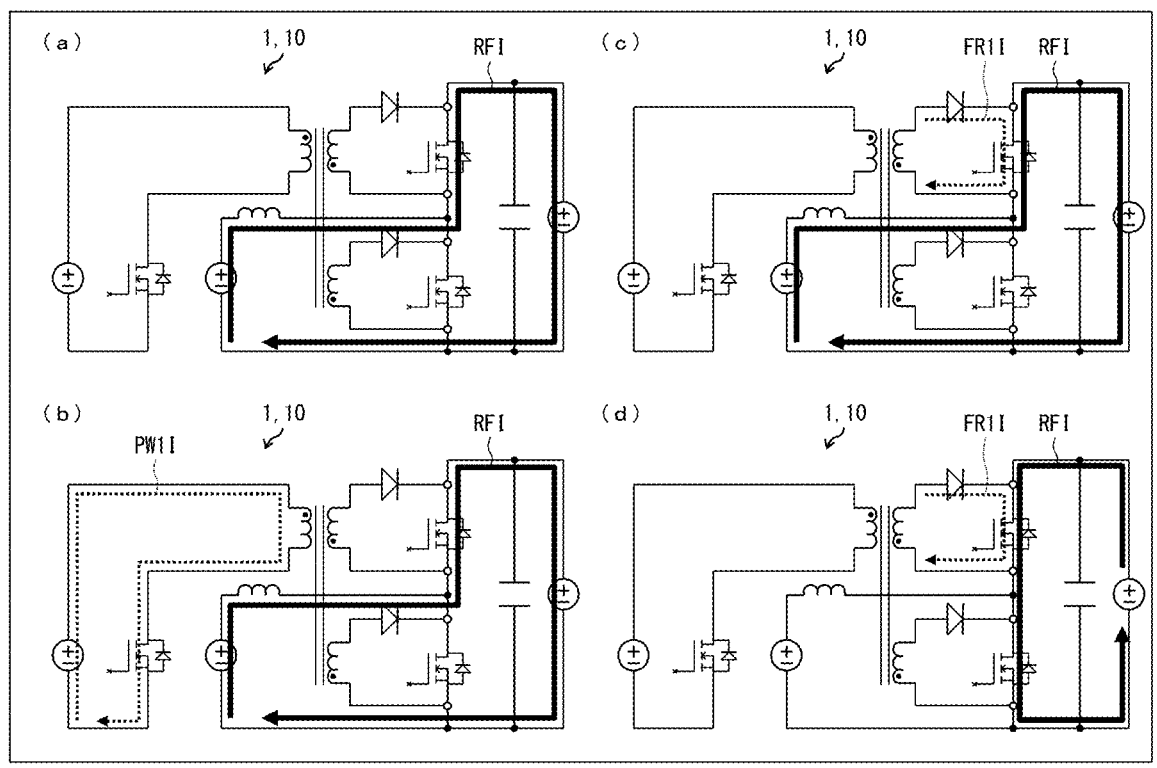
FIGS. 4(a) to 4(d) are diagrams for explaining the path of each current in a first step to a fourth step in a first time period, respectively.

FIG. 4 is a diagram for explaining the path of each current in the first to fourth steps in the first time period. Specifically, (a) to (d) of FIG. 4 are diagrams for explaining the path of each current in the first to fourth steps in the first time period, respectively. For convenience of illustration, in FIG. 4, the reference numerals of the elements in FIG. 1 are omitted. Also, in FIG. 4, the illustration of each element is simplified in comparison to FIG. 1.

Drive Method in First Time Period of Half-Bridge Circuit 1: First Step to Fourth Step According to the drive method of the first time period of the half-bridge circuit 1, the four steps below are executed in order. In the following, each step is described in detail.

First step: Applying a forward voltage to FSW1 and thus causing a rectified current to flow Second step: Turning TTR1 ON and thus causing a current to flow to PW1

Third step: Turning TTR1 OFF and thus causing a current to flow to FR1

Fourth step: Applying a reverse voltage to FSW1 and thus stopping the rectified current First Step: Causing Rectified Current to Flow to Rectifier Function Unit Prior to the first step, current is flowing from CO1 to SSW1. Thus, in the first step, SSW1 is turned OFF, generating an electromotive force in CO1. This electromotive force allows a forward voltage of approximately 1 V to be applied to FSW1. As a result, a rectified current (RFI) can be caused to flow to FSW1. In other words, in the first step, FSW1 is used as a rectifier function unit. RFI flows through the path illustrated in (a) of FIG. 4.

Note that, in the first step, the size of the current flowing to FR1 is less than the size of the current flowing to FSW1. Thus, in (a) of FIG. 4, unlike (c) to (d) of FIG. 4, FR1I is not illustrated.

Second Step: Causing Current to Flow to Primary Winding

Following the first step, TTR1 is turned ON. This allows PW1I to flow. PW1I flows through the path illustrated in (b) of FIG. 4. In the second step, PW1I increases substantially linearly over time.

Third Step: Causing Current to Flow to Rectifying Element Following the second step, TTR1 is turned OFF, causing PW1I to be approximately 0 A. This allows FR1I to flow. FR1I flows through the path illustrated in (c) of FIG. 4. As illustrated in (c) of FIG. 4, FR1I flows from SW1 to FR1.

This current path of FR1I may also be described from another standpoint. In particular, the current flowing to FSW1 in (c) of FIG. 4 will be described. (c) of FIG. 4 illustrates both RFI (facing upward at the position of FSW1 in the drawing) and FR1I (facing downward at the position of FSW1 in the drawing) in FSW1.

The two currents in directions opposite to each other flowing to FSW 1 at the same timing means that subtraction of the two current values occurs in FSW1.

Fourth Step: Applying Reverse Voltage to Rectifier Function Unit Following the third step, a reverse voltage is applied to FSW1. In the fourth step, SSW1 is turned ON, and thus used as a transistor function unit. Turning SSW1 ON allows a reverse voltage to be applied to FSW1. The method of applying the reverse voltage may be selected from a variety of methods according to the type of power supply circuit. The reverse voltage should thus be applied using a method corresponding to the various power supply circuits.

Concurrent with the application of the reverse voltage, a transient current (RFI in the reverse direction) that charges the parasitic capacitance of the FSW1 occurs. The transient current flows along the path indicated by RFI in (d) of FIG. 4.

In addition, although not illustrated in (d) of FIG. 4, current flows along the path "LV1 positive electrode→CO1→SSW1→LV1 negative electrode" from the start point of the fourth step.

Principle of Transient Current Reduction in Fourth Step

The current that charges the parasitic capacitance of FSW1 is not only RFI in the reverse direction. The FR1I flowing in the third step flows along a path that charges the parasitic capacitance of FSW1 (refer to (d) of FIG. 4). That is, the parasitic capacitance can be charged by FR1I and RFI. Thus, the transient current is a value obtained by subtracting an amount equivalent to FR1I. That is, the transient current can be effectively reduced compared to the related art.

Connection Format of Transformer Capable of Storing and Releasing Magnetic Energy TR1 is a member for storing and releasing magnetic energy. Thus, TR1 is configured in a connection format that allows both the storage and release of the magnetic energy described below.

Magnetic Energy Storage

In a case that a positive voltage is applied to a black dot side based on a non-black dot side of PW1, then a positive voltage occurs in SW1 on the black dot side based on the non-black dot side. However, in the half-bridge circuit 1, FR1 is interposed in the path from the black dot side to the non-black dot side of SW1. Thus, a reverse voltage is applied to FR1, and FR1I does not flow.

Further, in the half-bridge circuit 1, SR1 is interposed in the path from the black dot side to the non-black dot side of TW1. Even in SR1, a rectifying element current does not flow. Accordingly, in the second step, the magnetic energy originating from PW1I can be stored in TR1.

Magnetic Energy Release

By the blocking of PW1I in the third step, the polarity of the voltage applied to SW1 is reversed. Thus, a forward voltage is applied to FR1, and FR1I flows.

Furthermore, in the half-bridge circuit 1, the polarity of the voltage applied to TW1 is also reversed. However, in the third step, since SSW1 is OFF, a high voltage of approximately 400 V is applied to the third terminal. Thus, SR1 does not cause current to flow. Thus, by the blocking of PW1I in the third step, FR1I is caused to flow.

As described above, in the half-bridge circuit according to an aspect of the present disclosure, a connection relationship of the transformer is set so that PW1I and FR1I are not caused to flow at the same time. Thus, the presence or absence of a black dot (polarity) of each of the primary winding to the tertiary winding may be designed in reverse.

Further, the blocking of PW1I causes one of the following results: (i) "the current flows to SW1 so as to pass through FSW1," or (ii) "the current flows to TW1 so as to pass through SSW1." In the step-up operation in the first embodiment, because the voltage of FSW1 is low, "the current flows to SW1 so as to pass through FSW1." In contrast, in the case of the step-down operation, "the current flows to TW1 so as to pass through SSW1."

Description of Effect of Reducing Transient Current

Figure 5:
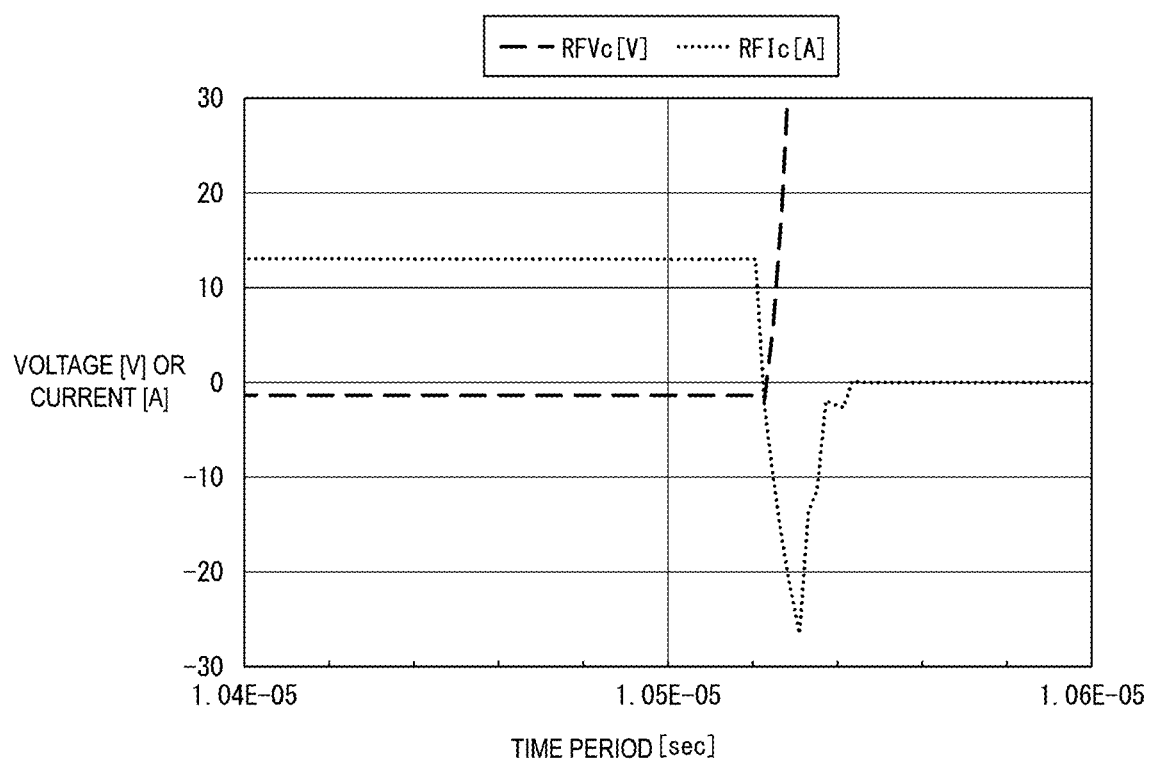
FIG. 5 is a diagram showing waveforms of rectifier function unit voltage and rectifier function unit current in a power supply circuit of a comparative example.

With reference to FIG. 3 and FIG. 5, the effect of reducing the transient current in the half-bridge circuit 1 will now be described. FIG. 5 is a graph showing waveforms of a rectifier function unit voltage (RFVc) and a rectifier function unit current (RFIc) in the power supply circuit 10*r*. The scales of the horizontal axis and vertical axis in the graph of FIG. 5 are set to the same scales as in the graph in FIG. 3.

1. Effect of Reducing Transient Current

Comparative Example

The transient current of FSW1, which is the rectifier function unit of the power supply circuit 10*r*, will now be described with reference to FIG. 5. When RFVc, as the reverse voltage, is applied at 400 V, a transient current (negative RFIc) flows (refer to at or near time "1.053E-5 sec"). In FIG. 5, voltage over 30 V is not shown for convenience of the scale of the vertical axis. However, RFVc is at or greater than 400 V. Thus, in the power supply circuit 10*r*, a transient current having a size of approximately 27 A flows.

Half-Bridge Circuit 1

The transient current in the half-bridge circuit 1 will now be described with reference to FIG. 3. Similar to the comparative example, a reverse voltage (RFV) of 400 V is applied (refer to at or near the same time as in the comparative example in FIG. 5). Nevertheless, the size of the transient current (negative RFI) is approximately 19 A. As described above, according to the half-bridge circuit 1, it is confirmed that the transient current can be reduced compared to that in the comparative example.

Improvements 1 to 4 for Efficiently Operating Half-Bridge Circuit 1

In the first embodiment, a plurality of preferred improvements are applied. These preferred improvements will be described below.

Improvement 1: Rectifying Element Current Caused to Flow When Rectified Current is Flowing to Rectifier Function Unit As described above, FR1I is used for transient current reduction. Thus, it is also important to suppress attenuation of FR1I during the time period until the transient current flows. In the first embodiment, FR1I is flowing when a rectified current flows to FSW1. When current is flowing to FSW1, the voltage of the first terminal relative to the second terminal decreases by an amount equivalent to the voltage drop of FSW1. On the other hand, FR1I flows from the second terminal towards the first terminal via SW1 and FR1. In other words, the current is caused to flow from the second terminal having a higher voltage to the first terminal having a lower voltage. Therefore, attenuation of FR1I can be suppressed.

Improvement 2: Increase in Inductance of Flow Path of Rectifying Element Current As described above, FR1I is used for transient current reduction. Thus, it is also important that FR1I continually flows when the transient current is flowing. In the first embodiment, the inductance (hereinafter L12*a*) of the path from the first terminal to the second terminal via FSW1 is set greater than the inductance (hereinafter L12*b*) of the path from the first terminal to the second terminal via FR1. Thus, FR1I can be caused to continuously flow by L12*b* during a time period when a transient current is flowing to FSW1. In the first embodiment, L12*a* is 10 nH, and L12*b* is 100 nH. For example, L12*b* is preferably at least two times L12*a*. Further, L12*b* is more preferably at least ten times L12*a*.

Improvement 3: Increase in Turns of Primary Winding

A conduction loss occurs in each winding of TR1. In the first embodiment, conduction loss is reduced by reducing the current of PW1.

The winding current of a transformer is, in principle, inversely proportional to the turn ratio. In the first embodiment, the number of turns of SW1 and TW1 are each set to six. On the other hand, the number of turns of PW1 is set to nine. In other words, the number of turns of PW1 is set greater than each of the number of turns of SW1 and TW1. As a result, the amount of current of PW1 can be reduced while maintaining the current of SW1 or TW1. The reduction in the amount of current makes it possible to reduce conduction loss.

Improvement 4: Magnetic Energy Ensured on Secondary Winding Side

As described above, FR1I is used for transient current reduction. The FR1I is generated by the magnetic energy of TR1. Thus, storage of a greater amount of magnetic energy in TR1 leads to further reduction in transient current. In the first embodiment, improvements are made to store a greater amount of magnetic energy in TR1.

Specifically, in the first embodiment, the voltage drop amount of FSW1 generated by current flowing from the second terminal to the first terminal is set greater than the voltage drop amount at a point in time when FR1 conduction starts.

Such a configuration allows current to flow to SW1 via FR1 when current is flowing to FSW1. This current can be verified in FR1I in FIG. 2. As shown in FIG. 2, at time "1.00E-5 sec," approximately 2 A of FR1I is flowing. Thus, it is understood that PW1I at that same time increases not from 0 A, but from a start point (initial value) of approximately 2 A. In the first embodiment, such storage of magnetic energy is also performed.

Description of Drawing Used in Operation
Explanation of Second Time Period of Half-Bridge Circuit 1

The step-down operation of the half-bridge circuit 1 is described below. In the step-down operation, SSW1 is used as a rectifying element (rectifier function unit) and FSW1 is used as a transistor element (transistor function unit). As such, the step-down operation time period is an example of the second time period.

Figure 6:
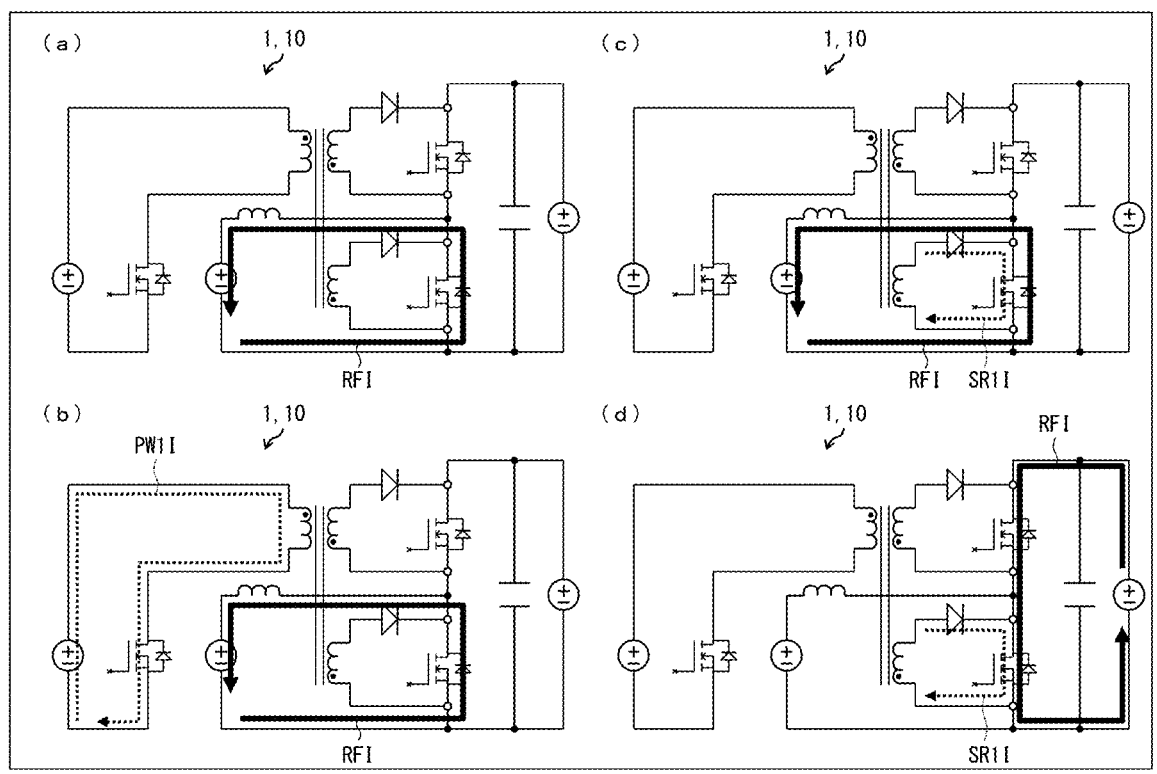
FIGS. 6(a) to 6(d) are diagrams for explaining the path of each current in a first step to a fourth step in a second time period, respectively.

FIG. 6 is a diagram for explaining the path of each current in the first to fourth steps in the second time period. FIG. 6 is a diagram paired with FIG. 4 (description of the step-up operation). FIG. 6 illustrates the path of each current in the first to fourth steps. Specifically, (a) to (d) of FIG. 6 illustrate the path of each current in the first to fourth steps, respectively. RFI is the current of the rectifier function unit (SSW1 in the case of FIG. 6). SR1I is the current of the second rectifying element (second rectifying element current). As illustrated in (c) of FIG. 6, SR1I flows from TW1 to SR1.

Drive Method in Second Time Period of Half-Bridge Circuit 1: First Step to Fourth Step According to the drive method of the second time period of the half-bridge circuit 1, the four steps below are executed in order.

First step: Applying a forward voltage to SSW1 and thus causing a rectified current to flow Second step: Turning TTR1 ON and thus causing a current to flow to PW1

Third step: Turning TTR1 OFF and thus causing a current to flow to SR1

Fourth step: Applying a reverse voltage to SSW1 and thus stopping the rectified current In the half-bridge circuit 1, in the step-down operation, the rectifier function unit and the switch function unit are switched between the upper and lower arms relative to the step-up operation. The orientation of the CO1 current is also reversed. These matters are the same as in the half-bridge circuit in the related art. Therefore, although the arm in which the transient current is generated differs, the effect of reducing the transient current in the step-down operation is the same as the effect of reducing the transient current in the step-up operation. This is because the upper and lower arms have the same configuration based on the same elements.

For example, on the basis of improvement 2 described above, the inductance of the path from the fourth terminal to the third terminal via the second rectifying element is set to be at least two times greater than the inductance of the path from the fourth terminal to the third terminal via the second switching element.

Further, on the basis of improvement 4 described above, the voltage drop amount of the second switching element generated by the current flowing from the fourth terminal to the third terminal is set greater than the voltage drop amount at a point in time when the second rectifying element starts conduction.

Thus, although not illustrated, the amount of transient current reduction in the step-down operation is also the same as the amount of transient current reduction in the step-up operation.

Consider a half-bridge circuit including a first time period and a second time period as operation time periods. In the half-bridge circuit, (i) FSW1 and SSW1 are used as a rectifier function unit and a transistor function unit, respectively, in the first time period, and (ii) FSW1 and SSW1 are used as a transistor function unit and a rectifier function unit, respectively, in the second time period. In this case, by applying the half-bridge circuit 1 of the first embodiment as the half-bridge circuit, it is possible to reduce the transient current in both the first time period and the second time period by one transformer (TR1).

Modified Example: Scope of Application of Element

In the first embodiment, an example is given in which FSW1 and SSW1 are cascode GaN-HEMTs and FR1 and SR1 are SiC-SBDs. The types of these elements are not particularly limited to a specific type as long as they fall within the scope of the elements described above. Similarly, the type of TTR1 is not particularly limited to a specific type as long as the type has a transistor function.

Second Embodiment

Figure 7:
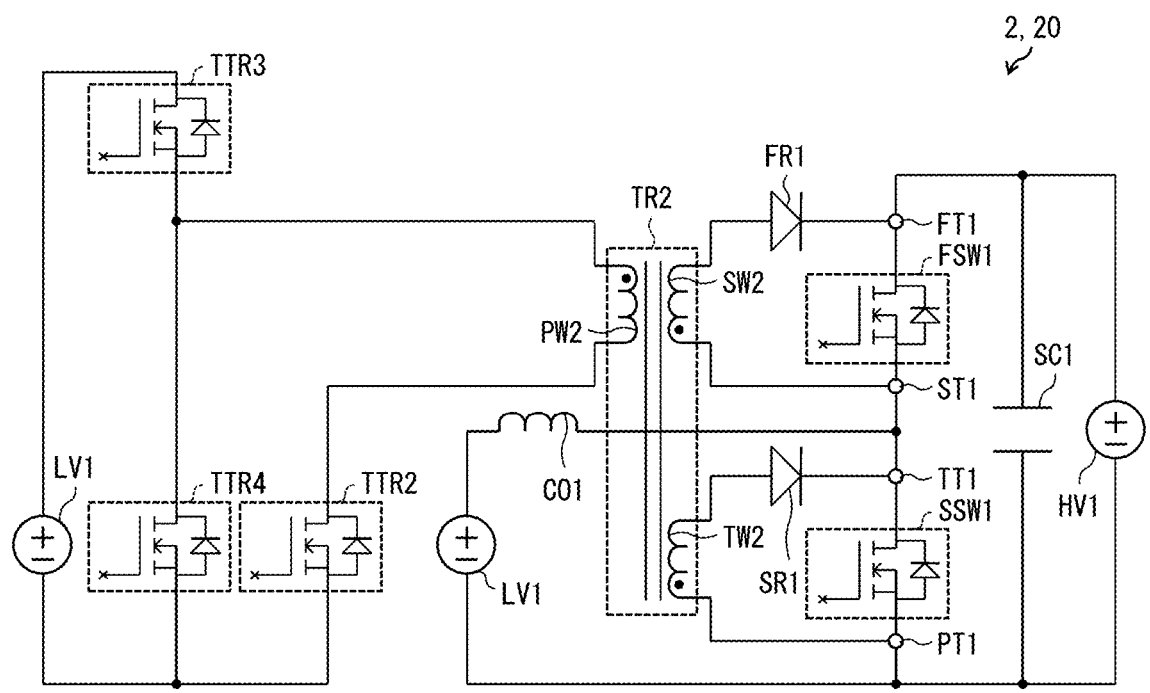
FIG. 7 is a diagram illustrating a circuit configuration of a power supply circuit according to a second embodiment.

FIG. 7 is a diagram illustrating a circuit configuration of a power supply circuit 20 according to the second embodiment. The power supply circuit 20 includes a half-bridge circuit 2. In the half-bridge circuit 2, TV1 of the half-bridge circuit 1 is replaced with LV1. In other words, in the power supply circuit 20, LV1 also serves as a power supply of the half-bridge circuit 2. According to this configuration, the total number of power supplies in the power supply circuit 20 can be reduced, which is advantageous in terms of cost.

In the half-bridge circuit 2, a transformer TR2 is provided in place of TR1 of the half-bridge circuit 1. TR2 includes a primary winding PW2, a secondary winding SW2, and a tertiary winding TW2.

Further, in the half-bridge circuit 2, transistor elements TTR2, TTR3, TTR4 are provided in place of TTR1 of the half-bridge circuit 1. The half-bridge circuit 2 is a modified example of the circuit configuration on the primary winding side with respect to the half-bridge circuit 1. TTR2, TTR3, and TTR4 all function as transistor elements.

With such a circuit configuration as well, turning TTR2 and TTR3 ON allows storage of magnetic energy in TR2, similar to the first embodiment. Thus, the transient current can be reduced.

Third Embodiment

Figure 8:
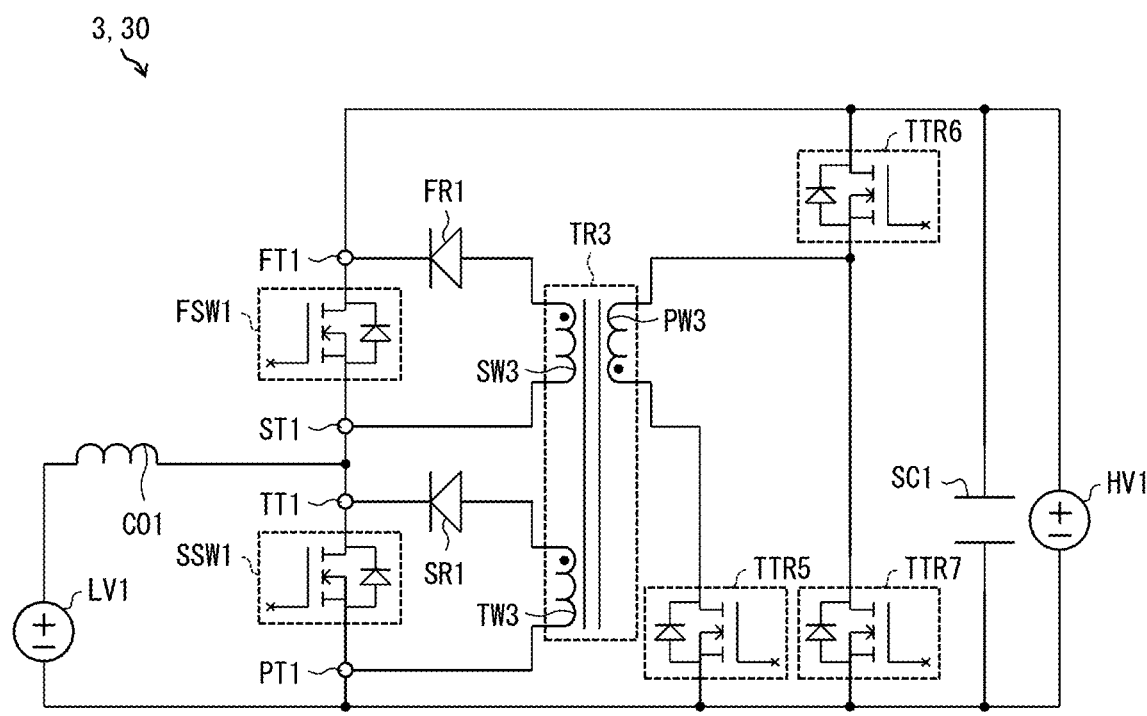
FIG. 8 is a diagram illustrating a circuit configuration of a power supply circuit according to a third embodiment.

FIG. 8 is a diagram illustrating a circuit configuration of a power supply circuit 30 according to the third embodiment. The power supply circuit 30 includes a half-bridge circuit 3. In the half-bridge circuit 3, TV1 of the half-bridge circuit 1 is replaced with HV1. According to this configuration as well, the total number of power supplies in the power supply circuit 30 can be reduced, which is advantageous in terms of cost.

In the half-bridge circuit 3, a transformer TR3 is provided in place of TR1 of the half-bridge circuit 1. TR3 includes a primary winding PW3, a secondary winding SW3, and a tertiary winding TW3.

Further, in the half-bridge circuit 3, transistor elements TTR5, TTR6, TTR7 are provided in place of TTR1 of the half-bridge circuit 1. The half-bridge circuit 3 is also a modified example of the circuit configuration on the PW1 side with respect to the half-bridge circuit 1. TTR5, TTR6, and TTR7 also all function as transistor elements.

With such a circuit configuration as well, turning TTR5 and TTR6 ON allows storage of the magnetic energy in TR3, similar to the first embodiment, and thus the transient current can be reduced.

Fourth Embodiment

The half-bridge circuit according to an aspect of the present disclosure exhibits a higher effect with respect to a power supply circuit including the first time period and the second time period as the operation time periods. Examples of the power supply circuit include a bidirectional chopper circuit, an inverter circuit, a totem pole Power Factor Correction (PFC) circuit, and the like.

Figure 9:
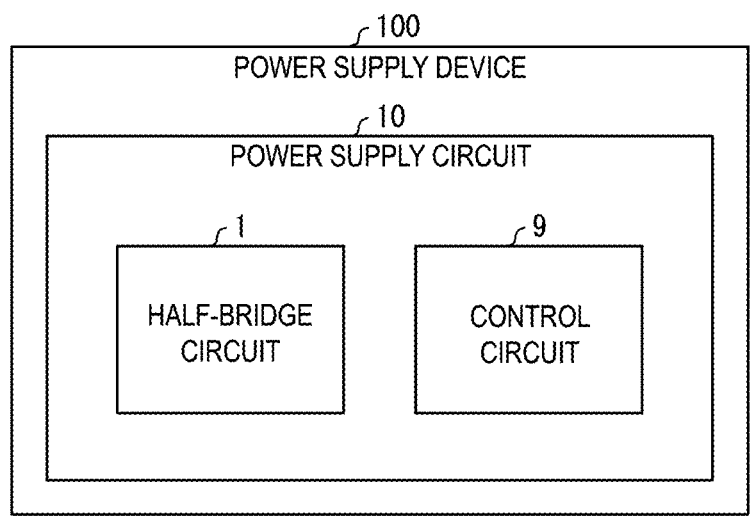
FIG. 9 is a diagram illustrating a power supply device according to a fourth embodiment.

FIG. 9 is a diagram illustrating a power supply device 100 provided with the power supply circuit 10 (power supply circuit including the half-bridge circuit 1). According to the half-bridge circuit 1, loss in the power supply circuit 10 and the power supply device 100 can be reduced. Furthermore, the power supply device 100 includes the control circuit 9. The control circuit 9 controls each component of the power supply circuit 10. More specifically, the control circuit 9 controls the ON/OFF switching of the elements provided to the power supply circuit 10. The first to fourth steps may be performed by the control circuit 9 controlling the ON/OFF of each switching element provided to the power supply circuit 10.

Supplement

A half-bridge circuit according to a first aspect of the present disclosure includes a first switching element connected to a first terminal serving as a high-voltage node and a second terminal serving as a switch node and a second switching element connected to a third terminal serving as a switch node and a fourth terminal serving as a low-voltage node. The half-bridge circuit further includes a transformer including a primary winding, a secondary winding, and a tertiary winding, a first rectifying element connected in parallel with the first switching element with the secondary winding interposed between the first rectifying element and the first switching element, a second rectifying element connected in parallel with the second switching element with the tertiary winding between the second rectifying element and the second switching element, a first transistor element connected to the primary winding, and a power supply connected to the primary winding. In a case that the first transistor element is turned ON, a primary winding current, serving as a current flowing from the power supply to the primary winding, flows, and in a case that the first transistor element is turned OFF, (i) a first rectifying element current, serving as a current flowing from the secondary winding to the first rectifying element flows, or (ii) a second rectifying element current, serving as a current flowing from the tertiary winding to the second rectifying element, flows.

As described above, a transient current generates a loss in a circuit. Thus, the inventors of the present application discovered the configuration described above on the basis of the idea that "causing a current generated by magnetic energy stored in a transformer to flow to each switching element leads to suppression of transient current."

According to the configuration described above, by turning the first transistor element ON, it is possible to cause a current to flow to the primary winding and store magnetic energy in the transformer. Then, by turning the first transistor element OFF, it is possible to convert the magnetic energy to the first rectifying element current, and cause the first rectifying element current to flow to the first switching element. In this first rectifying element current, the current component that becomes the transient current of the first switching element is caused to flow through an internal path formed from the secondary winding, the first rectifying element, and the first switching element. Thus, the transient current flowing to the first switching element can be reduced.

The above description of the secondary winding, the first rectifying element, and the first switching element also applies to the tertiary winding, the second rectifying element, and the second switching element. Accordingly, in the same way as described above, the transient current flowing to the second switching element can also be reduced.

As described above, according to the half-bridge circuit according to an aspect of the present disclosure, it is possible to effectively reduce transient current in both the first switching element and the second switching element. That is, the transient current can be more effectively reduced than in the related art.

In the half-bridge circuit according to a second aspect of the present disclosure, in the first aspect, preferably a polarity of the secondary winding from the second terminal toward the first terminal is the same as a polarity of the tertiary winding from the fourth terminal toward the third terminal.

According to the configuration (the winding configuration of the transformer) described above, of the first switching element and the second switching element, the rectifying element current (the first rectifying element current or the second rectifying element current) can be selectively caused to flow to the switching element having a lower applied voltage. That is, the rectifying element current can be selectively caused to flow to a predetermined switching element to which a reverse voltage will be applied (a switching element in which a transient current is expected to occur).

In the half-bridge circuit according to a third aspect of the present disclosure, in the first or the second aspect, preferably the first switching element is used as a rectifier function unit and the second switching element is used as a transistor function unit in a first time period, and the first switching element is used as a transistor function unit and the second switching element is used as a rectifier function unit in a second time period.

According to the configuration described above, the switching element used as the rectifier function unit in the first time period and the second time period can be switched. In other words, the transient current can be selectively generated in the first switching element or the second switching element, in accordance with the time period. In this case, with use of the transformer described above, the rectifying element current can be selectively caused to flow to the switching element in which the transient current flows.

In the half-bridge circuit according to a fourth aspect of the present disclosure, in the third aspect, preferably conduction of the first rectifying element current is started within a time period when current is flowing from the second terminal to the first terminal via the first switching element in the first time period, and conduction of the second rectifying element current is started within a time period when current is flowing from the fourth terminal to the third terminal via the second switching element in the second time period.

According to the configuration described above, in the first time period, the voltage of the second terminal is greater than the voltage of the first terminal by an amount equivalent to the voltage drop amount of the first switching element. Thus, the first rectifying element current can be caused to flow from the second terminal (the terminal on the high-voltage side) toward the first terminal (the terminal on the low-voltage side), allowing the first rectifying element current to continuously flow.

Further, in the same way as described above for the first time period, the second rectifying element current can be caused to continuously flow in the second time period. As a result, the effect of reducing the transient current can be further enhanced for both the switching elements in the half-bridge circuit.

In the half-bridge circuit according to a fifth aspect of the present disclosure, in any one of the first to fourth aspects, preferably an inductance of a path from the second terminal to the first terminal via the first rectifying element is at least two times greater than an inductance of a path from the second terminal to the first terminal via the first switching element, and an inductance of a path from the fourth terminal to the third terminal via the second rectifying element is at least two times greater than an inductance of a path from the fourth terminal to the third terminal via the second switching element.

According to the configuration described above, the inductance of the path via the first rectifying element is sufficiently greater than the inductance of the path via the first switching element, thereby causing the first rectifying element current that was once conducted to continuously flow.

Further, in the same way as described above for the first rectifying element current, the second rectifying element current can also be caused to continuously flow. As a result, the effect of reducing the transient current can be further enhanced for both the switching elements in the half-bridge circuit.

In the half-bridge circuit according to a sixth aspect of the present disclosure, in any one of the first to fifth aspects, preferably a number of turns of the primary winding is greater than a number of turns of each of the secondary winding and the tertiary winding.

As described above, the winding current of a transformer is inversely proportional to the turn ratio. Thus, according to the configuration described above, the amount of current in the primary winding can be reduced while maintaining the amounts of current of each of the secondary winding and the tertiary winding. Thus, a reduction in conduction loss is possible.

In the half-bridge circuit according to a seventh aspect of the present disclosure, in any one of the first to sixth aspects, preferably a voltage drop amount of the first switching element generated by a current flowing from the second terminal to the first terminal is greater than a voltage drop amount of the first rectifying element at a point in time when conduction starts, and a voltage drop amount of the second switching element generated by a current flowing from the fourth terminal to the third terminal is greater than a voltage drop amount of the second rectifying element at a point in time when conduction starts.

According to the configuration described above, when current is flowing to the first switching element, the current can be caused to flow to the secondary winding via the first rectifying element. Thus, it is possible to store magnetic energy from the secondary winding side to the transformer.

Further, in the same way as described above for the first switching element, the first rectifying element, and the secondary winding, it is also possible to store magnetic energy from the tertiary winding side to the transformer. As a result, the effect of reducing the transient current can be further enhanced.

A power supply circuit according to an eighth aspect of the present disclosure preferably includes the half-bridge circuit according to any one of the first to seventh aspects.

According to the configuration described above, a power supply device with reduced loss can be realized by using the half-bridge circuit with a reduced transient current.

A method for driving a half-bridge circuit according to a ninth aspect of the present disclosure is a method for driving a half-bridge circuit including a first switching element connected to a first terminal serving as a high-voltage node and a second terminal serving as a switch node and a second switching element connected to a third terminal serving as a switch node and a fourth terminal serving as a low-voltage node. The half-bridge circuit further includes a transformer including a primary winding, a secondary winding, and a tertiary winding, a first rectifying element connected in parallel with the first switching element with the secondary winding interposed between the first rectifying element and the first switching element, a second rectifying element connected in parallel with the second switching element with the tertiary winding interposed between the second rectifying element and the second switching element, a first transistor element connected to the primary winding, and a power supply connected to the primary winding. The method includes a first step for applying a forward voltage to the first switching element and causing a rectified current to flow to the first switching element, a second step for turning the first transistor element ON after the first step and causing a primary winding current, serving as a current flowing from the power supply to the primary winding, to flow, a third step for turning the first transistor element OFF after the second step and causing a first rectifying element current, serving as a current flowing from the secondary winding to the first rectifying element, to flow, and a fourth step for applying a reverse voltage to the first switching element after the third step within a time period when the first rectifying element current is flowing.

According to the configuration described above, the same effects as those of the half-bridge circuit according to an aspect of the present disclosure are achieved.

APPENDIX

The method for driving a half-bridge circuit according to an aspect of the present disclosure can also be expressed as follows.

That is, a method for driving a half-bridge circuit according to an aspect of the present disclosure is a method for driving a half-bridge circuit including a first switching element connected to a first terminal serving as a high-voltage node and a second terminal serving as a switch node and a second switching element connected to a third terminal serving as a switch node and a fourth terminal serving as a low-voltage node. The half-bridge circuit further includes a transformer including a primary winding, a secondary winding, and a tertiary winding, a first rectifying element connected in parallel with the first switching element with the secondary winding interposed between the first rectifying element and the first switching element, a second rectifying element connected in parallel with the second switching element with the tertiary winding interposed between the second rectifying element and the second switching element, a first transistor element connected to the primary winding, and a power supply connected to the primary winding. The method includes a first step (A) for applying a forward voltage to the first switching element and causing a rectified current to flow to the first switching element, a second step (A) for turning the first transistor element ON after the first step (A) and causing a primary winding current, serving as a current flowing from the power supply to the primary winding, to flow, a third step (A) for turning the first transistor element OFF after the second step (A) and causing a first rectifying element current, serving as a current flowing from the secondary winding to the first rectifying element, to flow, and a fourth step (A) for applying a reverse voltage to the first switching element after the third step (A) within a time period when the first rectifying element current is flowing, or a first step (B) for applying a forward voltage to the second switching element and causing a rectified current to flow to the second switching element, a second step (B) for turning the first transistor element ON after the first step (B) and causing the primary winding current to flow from the power supply to the primary winding, a third step (B) for turning the first transistor element OFF after the second step (B) and causing a second rectifying element current, serving as a current flowing from the tertiary winding to the second rectifying element, to flow, and a fourth step (B) for applying a reverse voltage to the second switching element after the third step (B) within a time period when the second rectifying element current is flowing.

Supplementary Information

An aspect of the present disclosure is not limited to each of the above-described embodiments. It is possible to make various modifications within the scope of the claims. An embodiment obtained by appropriately combining technical elements each disclosed in different embodiments falls also within the technical scope of the present disclosure. Furthermore, technical elements disclosed in the respective embodiments may be combined to provide a new technical feature.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A half-bridge circuit comprising:
   a first switching element connected to a first terminal serving as a high-voltage node and a second terminal serving as a switch node; and
   a second switching element connected to a third terminal serving as a switch node and a fourth terminal serving as a low-voltage node,
   wherein the first switching element and the second switching element are connected in series,
   wherein the half-bridge circuit further includes
      a transformer including a primary winding, a secondary winding, and a tertiary winding,
      a capacitor connected to the first terminal and the fourth terminal,
      a first rectifying element connected in parallel with the first switching element with the secondary winding interposed between the first rectifying element and the first switching element,
      a second rectifying element connected in parallel with the second switching element with the tertiary winding interposed between the second rectifying element and the second switching element,
      a first transistor element connected to the primary winding, and
      a power supply connected to the primary winding,
   in a case that the first transistor element is turned ON,
      a primary winding current, serving as a current flowing from the power supply to the primary winding, flows, and
      a current flowing through each of the secondary winding and the tertiary winding is suppressed by the first rectifying element or the secondary winding, in a case that the first transistor element is turned OFF,
      a current flowing from the power supply to the primary winding is suppressed by the first transistor element, and
      (i) a first rectifying element current, serving as a current flowing from the secondary winding to the first rectifying element, flows or
      (ii) a second rectifying element current, serving as a current flowing from the tertiary winding to the second rectifying element, flows.

2. The half-bridge circuit according to claim 1,
   wherein a polarity of the secondary winding from the second terminal toward the first terminal is the same as a polarity of the tertiary winding from the fourth terminal toward the third terminal.

3. The half-bridge circuit according to claim 2,
   wherein the first switching element is used as a rectifier function unit and the second switching element is used as a transistor function unit in a first time period, and
   the first switching element is used as a transistor function unit and the second switching element is used as a rectifier function unit in a second time period.

4. The half-bridge circuit according to claim 3,
   wherein conduction of the first rectifying element current is started within a time period when current is flowing from the second terminal to the first terminal via the first switching element in the first time period, and
   conduction of the second rectifying element current is started within a time period when current is flowing from the fourth terminal to the third terminal via the second switching element in the second time period.

5. The half-bridge circuit according to claim 4,
   wherein an inductance of a path from the second terminal to the first terminal via the first rectifying element is at least two times greater than an inductance of a path from the second terminal to the first terminal via the first switching element, and
   an inductance of a path from the fourth terminal to the third terminal via the second rectifying element is at least two times greater than an inductance of a path from the fourth terminal to the third terminal via the second switching element.

6. The half-bridge circuit according to claim 3,
   wherein an inductance of a path from the second terminal to the first terminal via the first rectifying element is at least two times greater than an inductance of a path from the second terminal to the first terminal via the first switching element, and
   an inductance of a path from the fourth terminal to the third terminal via the second rectifying element is at least two times greater than an inductance of a path from the fourth terminal to the third terminal via the second switching element.

7. The half-bridge circuit according to claim 2,
   wherein an inductance of a path from the second terminal to the first terminal via the first rectifying element is at least two times greater than an inductance of a path from the second terminal to the first terminal via the first switching element, and
   an inductance of a path from the fourth terminal to the third terminal via the second rectifying element is at least two times greater than an inductance of a path from the fourth terminal to the third terminal via the second switching element.

8. The half-bridge circuit according to claim 1,
   wherein the first switching element is used as a rectifier function unit and the second switching element is used as a transistor function unit in a first time period, and
   the first switching element is used as a transistor function unit and the second switching element is used as a rectifier function unit in a second time period.

9. The half-bridge circuit according to claim 8,
   wherein conduction of the first rectifying element current is started within a time period when current is flowing from the second terminal to the first terminal via the first switching element in the first time period, and
   conduction of the second rectifying element current is started within a time period when current is flowing from the fourth terminal to the third terminal via the second switching element in the second time period.

10. The half-bridge circuit according to claim 9,
    wherein an inductance of a path from the second terminal to the first terminal via the first rectifying element is at least two times greater than an inductance of a path from the second terminal to the first terminal via the first switching element, and
    an inductance of a path from the fourth terminal to the third terminal via the second rectifying element is at least two times greater than an inductance of a path from the fourth terminal to the third terminal via the second switching element.

11. The half-bridge circuit according to claim 8,
    wherein an inductance of a path from the second terminal to the first terminal via the first rectifying element is at least two times greater than an inductance of a path from the second terminal to the first terminal via the first switching element, and
    an inductance of a path from the fourth terminal to the third terminal via the second rectifying element is at least two times greater than an inductance of a path from the fourth terminal to the third terminal via the second switching element.

12. The half-bridge circuit according to claim 1, wherein an inductance of a path from the second terminal to the first terminal via the first rectifying element is at least two times greater than an inductance of a path from the second terminal to the first terminal via the first switching element, and an inductance of a path from the fourth terminal to the third terminal via the second rectifying element is at least two times greater than an inductance of a path from the fourth terminal to the third terminal via the second switching element.

13. The half-bridge circuit according to claim 1, wherein a number of turns of the primary winding is greater than a number of turns of each of the secondary winding and the tertiary winding.

14. The half-bridge circuit according to claim 1, wherein a voltage drop amount of the first switching element generated by a current flowing from the second terminal to the first terminal is greater than a voltage drop amount of the first rectifying element at a point in time when conduction starts, and a voltage drop amount of the second switching element generated by a current flowing from the fourth terminal to the third terminal is greater than a voltage drop amount of the second rectifying element at a point in time when conduction starts.

15. A power supply device comprising:
the half-bridge circuit described in claim 1.

16. A method for driving a half-bridge circuit including a first switching element connected to a first terminal serving as a high-voltage node and a second terminal serving as a switch node and a second switching element connected to a third terminal serving as a switch node and a fourth terminal serving as a low-voltage node,
wherein the first switching element and the second switching element are connected in series,
wherein the half-bridge circuit further includes
a transformer including a primary winding, a secondary winding, and a tertiary winding,
a capacitor connected to the first terminal and the fourth terminal,
a first rectifying element connected in parallel with the first switching element with the secondary winding interposed between the first rectifying element and the first switching element,
a second rectifying element connected in parallel with the second switching element with the tertiary winding interposed between the second rectifying element and the second switching element,
a first transistor element connected to the primary winding, and
a power supply connected to the primary winding,
the method comprising:
a first step for applying a forward voltage to the first switching element and causing a rectified current to flow to the first switching element;
a second step for turning the first transistor element ON after the first step and thereby causing a current flowing through each of the secondary winding and the tertiary winding to be suppressed by the first rectifying element or the secondary winding as well as causing a primary winding current, serving as a current flowing from the power supply to the primary winding, to flow;
a third step for turning the first transistor element OFF after the second step and thereby causing a current flowing from the power supply to the primary winding to be suppressed by the first transistor element as well as causing a first rectifying element current, serving as a current flowing from the secondary winding to the first rectifying element, to flow; and
a fourth step for applying a reverse voltage to the first switching element after the third step within a time period when the first rectifying element current is flowing.

* * * * *